Patented Jan. 1, 1952

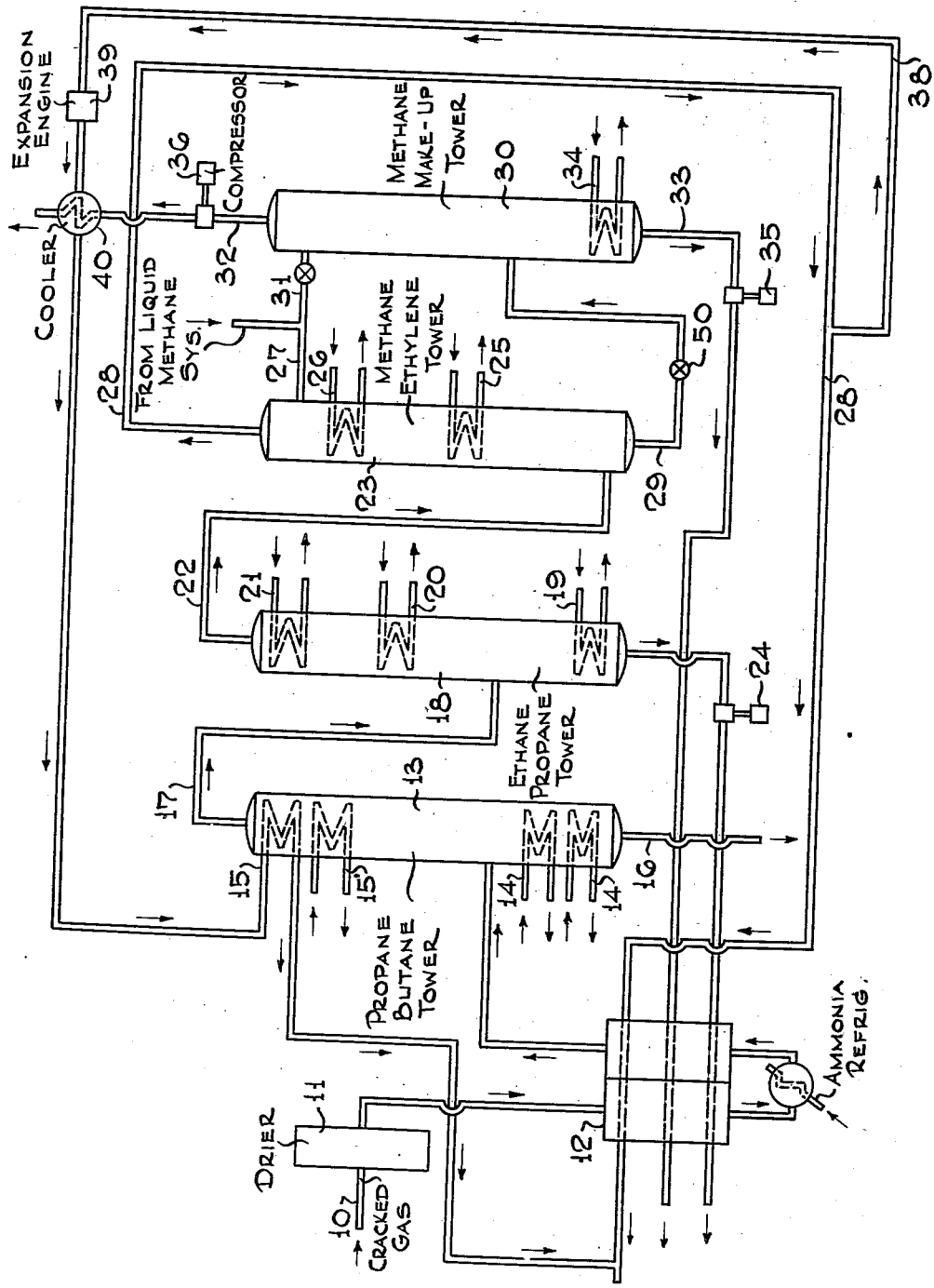

2,581,088

UNITED STATES PATENT OFFICE 2,581,088

FRACTIONATION OF GASEOUS MIXTURES

Lewis D. Etherington, Bayonne, and Harold W. Scheeline, West Orange, N. J., assignors to Standard Oil Development Company, a corporation of Delaware Application November 3, 1947, Serial No. 783,834

3 Claims. (Cl. 62—2)

This invention relates to the separation and purification of constituents of normally gaseous mixtures, and in particular to the recovery of ethylene and propylene from hydrocarbon mixtures.

The separation of normally gaseous constituents from complex mixtures has become, especially in the case of air fractionation, a highly developed industrial practice. For some time, the importance of the low molecular weight hydrocarbons, as chemical intermediates, particularly ethylene and propylene, has necessitated consideration of the application of similar techniques for the fractionation of low boiling hydrocarbon mixtures. For the separation of low molecular weight hydrocarbons from the abundantly available mixtures at oil fields and petroleum refineries, the employment of similar operating procedures to those used in air fractionation has been previously proposed. In the present invention the separation of these low boiling hydrocarbons is achieved by distillation in which by reason of a number of controlled heat exchange stages for removing or adding heat to the distillation system a high order of thermodynamic efficiency is attained. The novel operative factors involved in this type of distillation are also features of this invention.

It has generally been found that the employment of rectifying columns is the best means for separating low molecular weight hydrocarbons from their admixture one with the other. In a fractionating column, the feed mixture, as a gas or partially liquified system, is supplied at a relatively cold point, about the center of the column, the more volatile constituents are separated as vapor and the heavier constituents pass to the lower portion of the column as liquid. Usually, pressure of the order of between 200 and 500 pounds per square inch is applied to the column in order to raise the temperature level and to make more compact the fractionating system. In applying pressure to a hydrocarbon mixture, the difference in relative volatilities decreases and thus the need exists for more extensive reflux. Also, considerable energy must be expended in compressing the gaseous feed mixture. The present invention is an improvement over such processing in the employment of pressures of about the order of those of the feed supply as normally obtainable in a petroleum refinery.

In the prior art, in a fractional distillation column operated at sub-atmospheric temperatures for the concentration and recovery of low molecular weight hydrocarbons from admixture one with the other, the total reflux refrigeration has been applied at the uppermost or coldest part of the column. The point in such a fractional distillation column where the maximum reflux requirement (which fixes the total refrigeration load) normally occurs is at about the introduction of the feed, that is, the point at which a relatively high temperature exists. The minimum reflux requirement on the other hand, in the system is at the top of the column. In the case in which the total refrigeration is supplied at the coldest point in the column, the minimum number of plates is required but the load upon the refrigeration system is heavy, the refrigeration power requirement and cost being inversely proportional to the temperature level.

In the present invention, the refrigeration of a fractionating system is effected in stages, that is, only part of the total refrigeration requirement is effected at the lowest temperature level while the remainder of the cooling required above the point of feed supply is effected throughout the distillation zones at various stages in the fractionation and at progressively increasing temperature levels. With the heat removal from the fractionation zone by the extraneously controlled refrigeration means above the point of feed supply effected in this manner, the average temperature level of the refrigeration source may be raised. Thus, while the number of separation stages (i. e., plates or height of packing) in the tower will have to be increased, the total power requirement involved in the refrigeration system will be greatly reduced and in most cases an overall economy will result. External cooling means, such as expansion engines and similar devices, may be employed in product stream lines at various stages to supply added cooling by recycling such streams or as additional refrigeration sources.

Also, in the prior art, in a fractional distillation column operated for the concentration and recovery of low molecular weight hydrocarbons from admixture one with the other, heat has been applied totally at the bottom or hottest part of the column although an appreciable portion of the total heat requirement could be applied at a point just below the point of feed entry where a much lower temperature level exists. In the cases in which the heat at the bottom of the column was required at a comparatively low-temperature level, the heat has been supplied in the prior art by the condensation of refrigerant vapor, thus providing inexpensive by-product refrigeration for some higher temperature operation. In such a case where low-temperature heat is applied totally at the bottom of a fractionation column, the minimum number of plates or separation stages is required but the refrigeration available from the heating is at the highest or least valuable temperature level.

In the present invention, the heating for a low-temperature fractionating system is effected in stages; that is, only part of the heat is supplied at the highest temperature level while the remainder of the heating is effected in various stages throughout the zone between the bottom and feed entry points of the column and at progressively decreasing temperature levels. Thus, while the number of separation stages in this zone or the tower will have to be increased, by-product refrigeration may be supplied at a much lower average temperature level.

In general, therefore, the present invention relates to the fractional distillation of low molecular weight normally gaseous hydrocarbons, that is, to the separation mainly of the $C_1$, $C_2$, and $C_3$ hydrocarbons from their admixture with each other and minor amounts of the $C_4$ and $C_5$ hydrocarbons by passing the hydrocarbon mixtures into a distillation zone having therein at least three extraneously controlled heat exchange means at different temperature levels, thus permitting very close separation of the constituents of the mixtures in a particularly advantageous manner from an economic point of view. Expansion engines and similar cooling means may also be used for cooling product streams to provide added refrigeration especially at the lowest operating temperature levels.

The process of the invention as applied to the separation of the constituents of mixtures such as are currently available in a petroleum refinery, as cracked stocks and still gases, effects the separation between hydrocarbons having substantial differences in boiling points. The fractionation of the various mixtures is generally effected at pressures about the same as those at which the mixtures are obtained from the producing units. To illustrate this variation, the boiling points of the common constituents of such mixtures are at 1 atmosphere pressure:

|  | °C. |
| --- | --- |
| Hydrogen | −252.54 |
| Methane | −161.6 |
| Ethylene | −103.0 |
| Ethane | −88.7 |
| Propylene | −47.0 |
| Propane | −42.2 |
| Isobutane | −12.2 |
| Isobutylene | −6.6 |
| Normal butylene | −6.1 |
| Normal butane | −0.6 |
| Beta-butylene | +9.5 |
| Tertiary pentane | +27.95 |
| Secondary pentane | +27.95 |
| Normal pentane | +36.06 |

In order that the invention may be more fully appreciated and understood, the following description of an embodiment is presented. In this connection, a typical flow diagram for processing is presented in the drawing. In the drawing is shown feed supply entering through line 10. In this particular embodiment, the feed supply at about 110° F. and 30 pounds gauge pressure is obtained from a propane cracking unit. A typical analysis of a feed supply is as follows:

|  | Approx. mol. per cent |
| --- | --- |
| Hydrogen ($H_2$) | 10 |
| Methane ($CH_4$) | 30 |
| Ethylene ($C_2H_4$) | 30 |
| Ethane ($C_2H_6$) | 6 |
| Propane ($C_3H_8$) | 1 |
| Propylene ($C_3H_6$) | 14 |
| Butylenes | 8 |
| Amylene, pentane, benzol and toluol | 1 |

Such a mixture is first passed through drying equipment 11. The drying agent is of any of the commonly available types well known in the industry, such as activated alumina. The mixture is then cooled in equipment 12 by heat exchange with cold product streams and with ammonia refrigerant to a temperature of about −33° F. The product streams may have been passed through expansion devices to obtain low prevailing temperatures. At this temperature and at a pressure of about 25 pounds gauge, mixtures as exemplified above are at about their liquefaction point. The particular mixture is then passed to tower 13. The tower 13 is fitted with one or more lower heating coils 14, one or more upper cooling coils 15, and has about 20 plates. In the tower 13, the $C_4$ and heavier hydrocarbons are separated as bottoms at about 100° F. from the more volatile constituents as vapor at about −66° F. The bottoms are removed through line 16 to be further treated as desired. Reflux is provided by contact of the upwardly flowing vapors with the cooling coils 15' through which ethylene under pressure as a refrigerant at −80° F. is passed. The overhead vapors passing through line 17, consisting largely of $C_3$ and lower molecular weight hydrocarbons, pass to tower 18 wherein ethane and lighter hydrocarbons are separated from propylene and propane. The tower 18 has about 30 plates and is fitted with coils 19, 20 and 21. Coil 19 is usually a heating coil containing condensing high pressure ethylene, while 20 contains ethylene as a refrigerant at about −140° F., and coil 21 contains methane as a refrigerant at about −183° F. The tower 18 is operated at about 25 pounds gauge pressure.

The overhead product from tower 18, at a temperature of about −137° F., passes from the tower through line 22 to tower 23. The bottoms from the tower 18, at a temperature of about −25° F., pass through the pump 24 and thence through heat exchanger 12 for storage as desired. If the $C_3$ product is desired in vapor form its heat of vaporization can also be utilized to cool the feed stream and thus effect a saving of ammonia refrigerant. The tower 23 contains about 20 plates and is fitted with cooling coils 25 and 26. In this tower the highly volatile constituents, that is, mainly methane and hydrogen are separated from ethylene and ethane. The tower 23 is cooled by methane refrigerant boiling in coils 25 and 26 at temperatures of about −183° F. and −218° F., respectively. Also a small quantity of low pressure liquid methane is supplied as reflux through line 27 near the top of the tower. The overhead vapors passing through line 28 are largely hydrogen and methane. These vapors may be passed directly to the heat exchanger 12 or through expansion engine 39, cooler 40 and then through one of the coils 15 in column 13.

The distillation residue, consisting of $C_2$ constituents and some dissolved methane, is then passed through line 29 to the tower 30. The tower 30 contains about 10 plates, the heating coil 34 which contains condensing methane or condensing tower 13 vapor, and operates at about 10 pounds gauge pressure. The distillation residue from the tower 23 passing through line 29 therefore undergoes a pressure reduction in an expansion engine or valve 50 and therefore a temperature reduction before entering the tower 30. Into the top of the tower 30 through line 31 is supplied low pressure methane reflux. From the tower 30, the overhead vapors consisting mainly of methane pass through line 32 to compressors 36 and cooler 37 to be employed subsequently for refrigeration purposes. In compressing the methane overhead, the amount is gauged to be equivalent to the reflux to be supplied to the towers 23 and 30 together with the methane losses from the refrigeration system. Ethylene of about 74% purity (balance, largely ethane) is obtained as distillation residue from the tower 30 as liquid and is compressed in pump 35 to about 400 pounds gauge before passing to heat exchanger 12. If the cooling capacity of the $C_2$ product stream is greater than the cooling required for the feed stream, the $C_2$ stream can be utilized for providing reflux to one of the distillation columns, such as either column 13 or column 18.

For towers 18 and 30 which require the addition of low temperature heat, such heat may be supplied by the cooling of the original feed mixture or by the condensation of vapors from the upper portions of the various distillation zones. In this manner the condensed vapors may be utilized as reflux to the distillation zones and the saving in overall refrigeration is effected. The heat to towers 18 and 30 is shown as being supplied near the bottom of these towers by coils 19 and 34 respectively. An alternate method is, however, to employ a plurality of heating coils in towers 18 and 30 which are located at various stages between the bottom and feed points. By this alternate method, the heat is supplied at progressively decreasing temperature levels and hence lower temperature refrigeration will be available for providing reflux to the appropriate towers or for cooling the original mixture.

The heating and cooling in the various distillation zones may be effected by means of coils, fins or other such heat exchange means located within or without the distillation zones provided that the temperature of the various heat exchange media are controlled extraneously to the respective distillation zone. The contact between vapor and liquid within the fractional distillation zones may be aided by means of bubble cap plates, perforated plates, packing, or dephlegmator tubes.

What is claimed is:

1. A method of supplying the heat requirements in the fractional distillation of a mixture of normally gaseous hydrocarbons which comprises passing the said normally gaseous hydrocarbons into a distillation zone having at least two extraneously controlled heating media below the point of feed inlet maintained at different temperature levels.

2. In the operation of a fractional distillation tower characterized by successively lower temperatures from the bottom to the top of the tower the improvement which consists of maintaining a plurality of heating media in the said tower below the point of feed inlet maintained at successively lower temperature levels.

3. In a fractional distillation operation the method of increasing the thermodynamic efficiency of heating the portion of the feed stream moving downwardly in the fractionation tower in liquid phase which comprises successively contacting the said portion of the feed stream with a plurality of heating media maintained at successively higher temperatures with respect to the movement of the liquid portion of the feed stream.

LEWIS D. ETHERINGTON.
HAROLD W. SCHEELINE.

REFERENCES CITED

The following references are of record in the file of this patent:

UNITED STATES PATENTS

| Number | Name | Date |
|---|---|---|
| 2,035,516 | Wilkenson et al. | Mar. 31, 1936 |
| 2,067,349 | Schuftan | Jan. 12, 1937 |
| 2,113,130 | Dunham | Apr. 5, 1938 |
| 2,122,238 | Pollitzer | June 28, 1938 |
| 2,127,004 | Nelson | Aug. 16, 1938 |
| 2,180,435 | Schlitt | Nov. 21, 1939 |
| 2,230,619 | Katz | Feb. 4, 1941 |
| 2,250,949 | Gerlach | July 29, 1941 |
| 2,295,809 | Schuftan | Sept. 15, 1942 |
| 2,355,589 | Brandt | Aug. 8, 1944 |